United States Patent [19]

Falk et al.

[11] Patent Number: 4,969,742

[45] Date of Patent: Nov. 13, 1990

[54] INTEGRATED OPTIC WAVEMETER

[75] Inventors: R. Aaron Falk, Renton, Wash.; Loren E. Laybourn, Freehold, N.J.

[73] Assignee: The Boeing Company, Seattle, Wash.

[21] Appl. No.: 372,835

[22] Filed: Jun. 27, 1989

[51] Int. Cl.$^5$ .............................................. G01B 9/02
[52] U.S. Cl. ................................. 356/346; 350/96.13; 350/96.14
[58] Field of Search ........................................ 356/346

[56] References Cited

U.S. PATENT DOCUMENTS

| | | | |
|---|---|---|---|
| 4,170,416 | 10/1979 | Fencil | 356/346 |
| 4,172,663 | 10/1979 | Byer et al. | 356/352 |
| 4,173,442 | 11/1979 | Snyder | 356/346 |
| 4,319,843 | 3/1982 | Gornall | 356/346 |
| 4,329,055 | 5/1982 | Schaefer et al. | 356/346 |
| 4,426,155 | 1/1984 | Monchalin | 356/346 |
| 4,558,951 | 12/1985 | Ludman et al. | 356/346 |
| 4,683,448 | 7/1987 | Duchet et al. | 332/7.51 |
| 4,758,060 | 7/1988 | Jaeger et al. | 350/96.11 |
| 4,763,973 | 8/1988 | Inoue et al. | 350/96.13 |
| 4,900,113 | 2/1990 | Hatori | 356/346 |

Primary Examiner—Davis L. Willis
Assistant Examiner—Matthew W. Koren
Attorney, Agent, or Firm—Christensen, O'Connor, Johnson & Kindness

[57] ABSTRACT

A wavemeter fabricated using integrated optics technology. A waveguide structure is formed in a substrate, the structure including signal and reference waveguides and means for coupling an optical input signal into both waveguides. Means are provided for varying the optical path length of the signal waveguide with respect to the reference waveguide in response to a control signal. Optical signals passing through the waveguides are coupled to a detection system that produces a feedback signal having a characteristic that is a function of the optical path length difference between the waveguides, and of the wavelength of the optical input signal. A control system receives the feedback signal and produces the control signal such that the feedback signal characteristic is driven towards a predetermined value. The control signal then provides a measure of the wavelength of the optical input signal.

10 Claims, 2 Drawing Sheets

INTEGRATED OPTIC WAVEMETER

FIELD OF THE INVENTION

The present invention provides a wavemeter for measuring the wavelength of an optical signal.

BACKGROUND OF THE INVENTION

Most known techniques for measuring the wavelength of an optical signal make use of interference phenomena. For example, one prior wavelength measuring device comprises a Michelson interferometer having a movable mirror in one arm, so that the optical path length of that arm can be varied. An input beam of unknown wavelength is input into the system, along with a reference beam having a known wavelength. The interference fringes for the input and reference beams are detected and counted as the mirror is moved, and the input beam fringe count is compared to the reference beam fringe count. From the ratio of the two counts, it is possible to calculate the wavelength of the input beam. Devices of this type are described in U.S. Pat. Nos. 4,319,843, 4,426,155 and 4,329,055.

A second prior art technique for measuring wavelength is described in U.S. Pat. No. 4,173,442. This approach uses a Fizeau interferometer that is essentially a Fabry-Perot interferometer with a continuously variable thickness, i.e., with a continuously varying free spectral range (FSR). Recording of the spatial information from the interference pattern yields signals that can be analyzed to determine wavelength. A further class of prior art wavemeters makes use of Fabry-Perot cavities for producing interference patterns that have spatial periods related to the wavelength of the light. Examples of systems of this type are shown in U.S. Pat. Nos. 4,172,663 and 4,170,416.

SUMMARY OF THE INVENTION

The present invention provides a wavemeter fabricated using integrated optics technology. The advantages of the invention include compact size, decreased cost due to the use of lithographic replication, and reduced environmental interaction. 4 2).

In a preferred embodiment, the wavemeter comprises a waveguide structure formed in a substrate, the waveguide structure including a signal waveguide, a reference waveguide, and means for coupling an optical input signal into the signal and reference waveguides. Means are provided for varying the optical path length of the signal waveguide with respect to the optical path length of the reference waveguide in response to a control signal. A detection system is coupled to receive optical signals from the signal and reference waveguides, and includes means for producing a feedback signal.

The feedback signal has a characteristic that is a function of the optical path length difference between the signal and reference waveguides, and of the wavelength of the optical input signal. A control system receives the feedback signal and produces the control signal such that the resulting optical path length variation drives the feedback signal characteristic towards a predetermined value. The control signal thereby provides a measure of wavelength of the optical input signal.

DETAILED DESCRIPTION OF THE INVENTION

Figure 1:
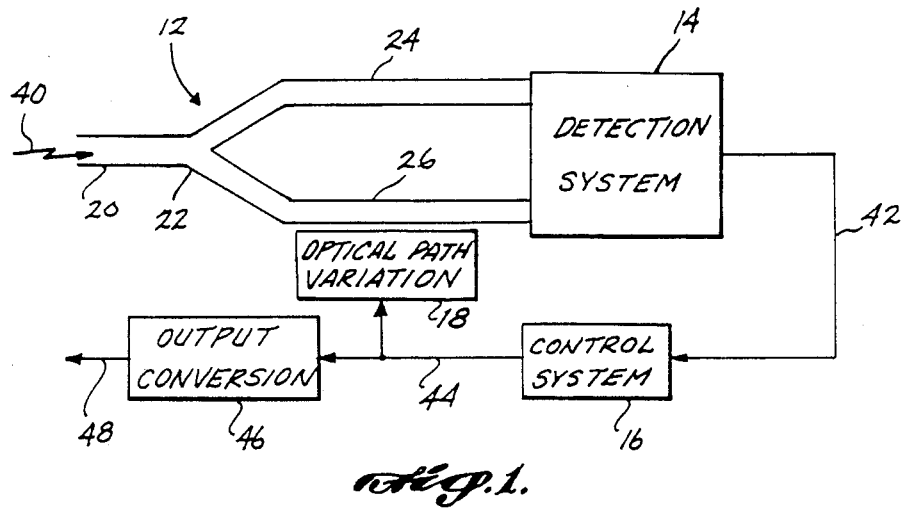
FIG. 1 is a schematic diagram illustrating the overall operation of the wavemeter of the present invention.

FIG. 1 schematically illustrates an integrated optic wavemeter constructed in accordance with the principles of the invention. The wavemeter comprises waveguide structure 12, detection system 14, control system 16, and optical path variation means 18. Waveguide structure 12 includes input waveguide 20 that branches at junction 22 to form reference waveguide 24 and signal waveguide 26. Waveguide structure 12 is fabricated using integrated optics technology in a suitable substrate such as glass or lithium niobate, as further described below. Optical path variation means 18 is positioned adjacent to a portion of signal waveguide 26, to permit variation of the optical path length of the signal waveguide with respect to the optical path length of the reference waveguide. An optical input signal 40 of unknown wavelength is introduced into input waveguide 20, and coupled by junction 22 into the signal and reference waveguides.

Detection system 14 receives the optical signals that have passed through reference waveguide 24 and signal waveguide 26, and produces an electronic feedback signal on line 42. The feedback signal has a characteristic, e.g., a magnitude, that is a function of both the wavelength of input signal 40, and of the optical path length difference between the signal and reference waveguides. The feedback signal on line 42 is received by control system 16, and used by the control system to produce a control signal on line 44. The control signal is received by the optical path variation means 18, and causes the optical path variation means to vary the optical path length of the signal waveguide with respect to the reference waveguide, such that a characteristic of the feedback signal on line 42 is driven towards null, or towards some other predetermined value. For example, in the embodiments described below, the feedback signal is a function of $\sin(\beta V/\lambda)$, where $V$ is the control signal voltage, $\lambda$ is the wavelength of input signal 40, and $\beta$ is a proportionallity constant. The control system produces voltage $V$ such that $\beta V/\lambda$ is driven towards $m\pi$, where m is any integer, such that the feedback signal $\sin(\beta V/\lambda)$ is driven to zero. The control signal on line 44 may itself be used as the system output, or the control signal may be passed to output conversion circuit 46 that produces an output signal 48 having desired characteristics.

Figure 2:
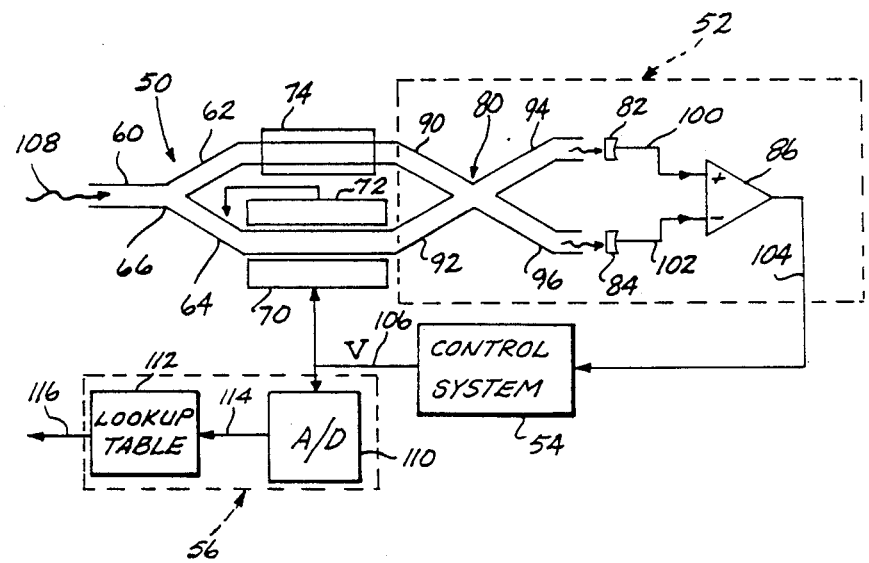
FIG. 2 is a schematic diagram of a first preferred embodiment of the wavemeter.

FIG. 2 sets forth a more detailed view of one preferred embodiment of the invention. The wavemeter shown in FIG. 2 includes waveguide structure 50, detection system 52, control system 54 and output conversion circuit 56. Waveguide structure 50 comprises input waveguide 60 that is coupled to reference waveguide 62 and signal waveguide 64 at junction 66. The waveguide structure, or at least signal waveguide 64, comprises an electro-optic substrate such as lithium niobate. The optical path length of the signal waveguide is varied by means of electrodes 70 and 72 that are positioned adjacent to a portion of signal waveguide 64. Optionally, reference waveguide 62 (or if desired signal waveguide 64) passes through fixed delay region 74 that delays the optical signal passing through the reference waveguide by a fixed amount, for the purposes discussed below.

Detection system 52 comprises X coupler 80, photodetectors 82 and 84, and difference amplifier 86. X-coupler 80 includes input arms 90 and 92 that are coupled to reference waveguide 62 and signal waveguide 64, respectively, and output arms 94 and 96. Photodetectors 82 and 84 are positioned adjacent to the ends of output arms 94 and 96, and convert the optical signals appearing in the output arms into corresponding electrical signals on lines 100 and 102, respectively. The signals on lines 100 and 102 are input to differential amplifier 86. The differential amplifier produces a feedback signal on line 104 that has an amplitude proportional to the difference between the amplitudes of the signals on lines 100 and 102.

The feedback signal is input to control system 54, as in the system described in FIG. 1. Control system 54 produces a control signal at voltage V on line 106 that is coupled to electrode 70, electrode 72 being grounded. The control signal is also input to output conversion circuit 56 that comprises A/D converter 110 and look-up table 112. A/D converter 110 converts the control signal on line 106 into a corresponding digital signal on line 114. Look-up table 112 converts the digital signal on line 114 into an output signal on line 116 having a magnitude corresponding to the wavelength of input signal 108.

Figure 3:
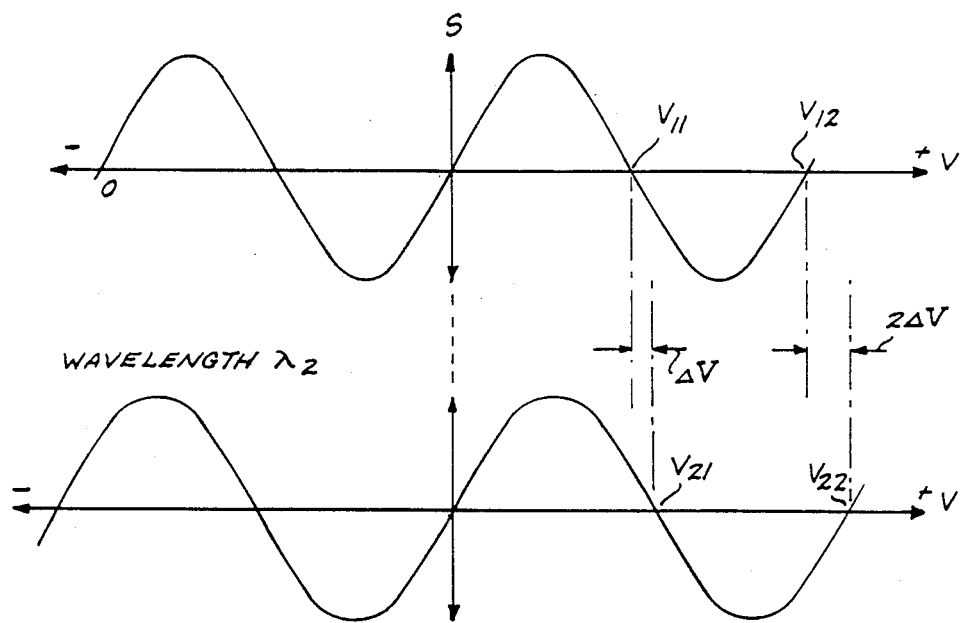
FIG. 3 is a graph illustrating the operation of the embodiment of FIG. 2.

The principle of operation of the system shown in FIG. 2 may be explained by reference to FIG. 3. The result of the combined operation of X-coupler 80 and differential amplifier 86 is to produce a feedback signal S on line 104 as follows:

$$S = A \sin(nk\alpha V + \phi) \quad (1)$$

where V is the voltage on electrode 70, $\alpha$ is a constant that describes the electro-optic interaction, k is the optical wave number of the input signal ($k = 2\pi/\lambda$), n is the effective index of refraction of the waveguide, $\phi$ is an offset phase produced by fixed delay region 74, and A is a constant gain factor. Initially, assume that the fixed delay $\phi$ is equal to zero, and that an optical input signal of wavelength $\lambda_1$ is introduced into the wavemeter. The result is that the amplitude of signal S varies sinusoidally with applied voltage V. This variation is shown at the upper half of the graph of FIG. 3, wherein the vertical axis represents the amplitude of feedback signal S, and the horizontal axis represents the voltage V applied to electrode 70. Equation 1, plotted for a second value of wavelength $\lambda_2$, is shown in the lower half of FIG. 3. The change in wavelength between $\lambda_1$ and $\lambda_2$ produces a change in the period of the signal. In particular, the shift from $\lambda_1$ to $\lambda_2$ causes the position of each zero crossing of the signal to shift, except at zero voltage. If the shift at the first zero crossing is $\Delta V$, then the shift at the mth zero crossing will be m$\Delta V$. In general, for the mth zero crossing $$\frac{V_{1m}}{V_{2m}} = \frac{\lambda_1}{\lambda_2} \quad (2)$$

where $V_{1m}$ is the voltage at zero crossing m at wavelength $\lambda_1$, and $V_{2m}$ is the voltage at zero crossing m at wavelength $\lambda_2$. It can be seen from Equation 2 that if the system is initially calibrated by finding the mth zero crossing for a known wavelength, then any other wavelength can be determined by measuring the voltage at its mth zero crossing.

The wavelengths that may be measured by the wavemeter of the present invention are those wavelengths at which interference effects occur, i.e., the optical waveguide should be predominately single moded at the measured wavelength. In addition, the wavelength variation to be measured should not exceed the free spectral range of the system. This latter constraint comes into play because at a given zero crossing, only phase shifts of up to $\pm \pi/2$ about the zero crossing will yield unambiguous results. The unambiguous free spectral range (FSR) is given by $$\frac{FSR}{\lambda_0} = \frac{1}{m} \quad (3)$$

where $\lambda_0$ is the center wavelength of the FSR. With reference to Equation 1 and FIG. 3, it may be appreciated that a choice of m may be effected by varying the optical delay element 74, thereby adjusting the value of $\phi$ in Equation 1. If high resolution is desired, then one can select a large value of m using a large fixed delay, with a consequent reduction in the free spectral range of the instrument. On the other hand, if a large free spectral range is desired at the expense of resolution, then a small delay can be used, or the delay element can be omitted altogether. One known and effective means for creating a delay region is to create a proton-exchange region along a portion of the reference waveguide. This process involves exchanging the lithium atoms in the lithium niobate crystal for hydrogen atoms. Alternatively, a fixed delay region can be created by fabricating the waveguide structure such that the physical path length of the reference waveguide is different from the physical path length of the signal waveguide.

In the embodiment of FIG. 2, the signal waveguide comprises an electro-optic material, and the optical path length of this waveguide is varied by generating an electric field in the waveguide. Other techniques can also be used to vary the optical path length of the signal waveguide with respect to the reference waveguide. For example, the signal waveguide could comprise a magneto-optic material such as iron-garnet, and the optical path variation means could comprise means for generating a magnetic field in response to the control signal. Alternately, the optical path variation means could comprise a thin film resistor positioned over the signal waveguide, such that the control signal causes heating of the waveguide, to thereby cause a thermally induced change in the optical path length. The optical path length could also be varied by applying a variable pressure to the waveguide, or by directing a light beam onto a waveguide that comprises a suitable nonlinear material such as gallium arsenide or lithium niobate.

Figure 4:
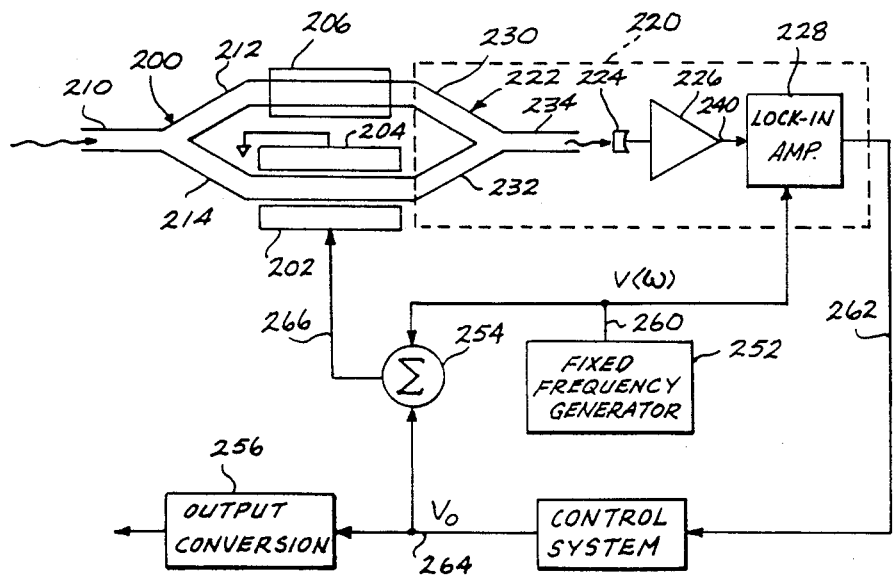
FIG. 4 is a schematic diagram of a second preferred embodiment of the wavemeter.

A second preferred embodiment of the invention is shown in FIG. 4. This embodiment includes waveguide structure 200, electrodes 202 and 204, and optical delay region 206. These elements may be identical to the corresponding elements shown in the embodiment of FIG. 2. Waveguide structure 200 includes input waveguide 210, reference waveguide 212, and signal waveguide 214. The wavemeter of FIG. 4 also includes detection system 220 that comprises waveguide structure 222, photodetector 224, amplifier 226 and lock-in amplifier 228. Waveguide structure 222 has the form of a 2:1 coupler comprising input arms 230 and 232 and output arm 234. Waveguide structures 200 and 222 are coupled together, such that the signal passing through reference arm 212 is coupled into input arm 230, and the signal passing through signal arm 214 is coupled into input arm 232. The optical signals input on arms 230 and 232 are combined onto arm 234, and incident onto photodetector 224. The photodetector converts the optical signal into an electric signal that is amplified by amplifier 226 to produce an electrical detection signal on line 240. The detection signal is input to lock-in amplifier 228.

The remainder of the system of FIG. 4 includes control system 250, fixed frequency generator 252, summing junction 254, and output conversion circuit 256. Frequency generator 252 produces a fixed frequency signal $V(\omega)$ on line 260 that is input to lock-in amplifier 228 and to summing junction 254. As a result of receiving signal $V(\omega)$, lock-in amplifier 228 produces a feedback signal on line 262 based upon the components of the detection signal on line 240 at frequency $\omega$. In response to the feedback signal, control system 250 produces a baseline signal $V_0$ on line 264 that is input to summing junction 254 and to output conversion circuit 256. The summing junction combines the baseline signal $V_0$ and the fixed frequency signal $V(\omega)$ to produce the control signal on line 266. In effect, the dithering voltage on electrode 202 produced by the fixed frequency signal $V(\omega)$ compensates so the fact that the detection system is single ended, in contrast to the bipolar detection system of the FIG. 2 embodiment.

While the preferred embodiments of the invention have been described, variations will be apparent to those skilled in the art. Accordingly, the scope of the invention is to be determined by reference to the following claims.

The embodiments of the invention in which an exclusive property or privilege is claimed are defined as follows:

1. An integrated optic wavemeter for producing a signal indicative of a wavelength of an optical input signal, the wavemeter comprising:
   a waveguide structure formed in a substrate, the waveguide structure including a signal waveguide and a reference waveguide, each waveguide having an optical path length, and means for coupling the optical input signal into the signal and reference waveguides;
   means for varying the optical path length of the signal waveguide with respect to the optical path length of the reference waveguide in response to a control signal;
   a detection system coupled to receive optical signals from the signal and reference waveguides and including means for producing a feedback signal having a characteristic that is a function of an optical path length difference between the signal and reference waveguides, and of the wavelength of the optical input signal; and
   a control system coupled to receive the feedback signal and including means for producing the control signal and coupling the control signal to the means for varying the optical path length, the control signal being produced such that the resulting variation of the optical path length drives the feedback signal characteristic towards a predetermined value, whereby the control signal provides a measure of the wavelength of the optical input signal.

2. The wavemeter of claim 1, wherein the substrate comprises an electro-optic material, and wherein the means for varying the optical path length comprises means for generating an electric field in the signal waveguide.

3. The wavemeter of claim 2, wherein the means for generating an electric field comprises an electrode positioned adjacent to a portion of the signal waveguide.

4. The wavemeter of claim 1, wherein the waveguide structure is formed so that there is a non-zero optical path length difference between the signal and reference waveguides that is independent of the control signal.

5. The wavemeter of claim 1, wherein the detection system comprises an X-coupler having first and second input arms coupled to receive optical signals from the reference and signal waveguides respectively, and first and second output arms, first and second photodetection means for receiving optical signals from the first and second output arms respectively and producing corresponding first and second electric signals, and differencing means for receiving the first and second electrical signal and producing the feedback signal such that the feedback signal characteristic corresponds to the difference between the first and second electrical signals.

6. The wavemeter of claim 5, wherein the substrate comprises an electro-optic material, and wherein the means for varying the optical path length comprises means for generating an electric field in the signal waveguide.

7. The wavemeter of claim 5, wherein the waveguide structure is formed so that there is a non-zero optical path length difference between the signal and reference waveguides that is independent of the control signal.

8. The wavemeter of claim 1, wherein the control system comprises means for generating a fixed frequency signal, means for summing the fixed frequency signal with the control signal to produce a summation signal and for applying the summation signal to the means for varying the optical path length, and wherein the detection system comprises means for combining optical signals from the signal and reference waveguides and converting the combined optical signals into a corresponding electrical detection signal, and frequency selection means responsive to the fixed frequency signal for producing the feedback signal in response to those portions of the detection signal having said fixed frequency.

9. The wavemeter of claim 8, wherein the substrate comprises an electro-optic material, and wherein the means for varying the optical path length comprises means for generating an electric field in the signal waveguide.

10. The wavemeter of claim 8, wherein the waveguide structure is formed so that there is a non-zero optical path length difference between the signal and reference waveguides that is independent of the control signal.

* * * * *